(12) United States Patent
Kim et al.

(10) Patent No.: US 7,092,347 B2
(45) Date of Patent: Aug. 15, 2006

(54) OPTICAL PICKUP APPARATUS HAVING DISK THICKNESS DEVIATION CORRECTION AND METHOD THEREFOR

(75) Inventors: Tae-kyung Kim, Suwon (KR); Chong-sam Chung, Seongnam (KR); Young-man Ahn, Suwon (KR); Hea-jung Suh, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/909,347

(22) Filed: Aug. 3, 2004

(65) Prior Publication Data

US 2005/0002312 A1   Jan. 6, 2005

Related U.S. Application Data

(62) Division of application No. 09/711,949, filed on Nov. 15, 2000, now Pat. No. 6,798,731.

(51) Int. Cl.
 *G11B 7/00* (2006.01)
(52) U.S. Cl. .......................... 369/124.14; 369/124.12; 369/124.03; 369/53.19
(58) Field of Classification Search ............. 369/112.1, 369/53.19, 44.32, 124.14
 See application file for complete search history.

(56) References Cited

U.S. PATENT DOCUMENTS

| | | | |
|---|---|---|---|
| 4,564,754 A | 1/1986 | Sato et al. | |
| 4,831,613 A | 5/1989 | Kanda | |
| 4,957,355 A | 9/1990 | Sato | |
| 5,671,207 A | * 9/1997 | Park | 369/44.23 |
| 5,675,564 A | 10/1997 | Muramatsu et al. | |
| 5,712,842 A | 1/1998 | Yamamoto et al. | |
| 5,719,846 A | 2/1998 | Matoba et al. | |
| 5,742,437 A | * 4/1998 | Eguchi et al. | 359/739 |

(Continued)

FOREIGN PATENT DOCUMENTS

JP    64-1122    1/1989

(Continued)

OTHER PUBLICATIONS

Kenji Yamamoto et al., "0.8-Numerial-Aperture Two-Element Objective Lens for the Optical Disk", Jpn. J. Appl. Phys. vol. 36 (1997), pp. 456-459, Part 1, No. 1B, Jan. 1997.

(Continued)

*Primary Examiner*—Gautam R. Patel
(74) *Attorney, Agent, or Firm*—Stein, McEwen & Bui, LLP (57) ABSTRACT

An optical pickup apparatus for compensating for the deviation in the thickness of the optical disk and method therefor. The optical pickup includes a light source which emits light, an optical path changer which changes a proceeding path of incident light, an objective lens which focuses incident light to form a light spot on an optical disk, a light splitter, provided on the optical path between the light source and the optical path changer, which splits incident light into at least two light beams including first and second light beams so that at least two light spots including a main light spot having no aberration and an auxiliary light spot having a predetermined spherical aberration are formed on the optical disk, a photodetector including first and second light receiving portions which respectively receive the first and second incident light beams reflected by the optical disk and passing through the optical path changer, and a signal processing portion, including a delay which delays the phase of a second signal in order to synchronize a first signal and the second signal which are detected and optoelectrically converted by the first and second light receiving portions, to compensate for the deviation in the thickness of the optical disk.

11 Claims, 6 Drawing Sheets

U.S. PATENT DOCUMENTS

| | | | |
|---|---|---|---|
| 5,896,218 A | 4/1999 | Iizuka | |
| 6,005,834 A | 12/1999 | Maeda et al. | |
| 6,040,931 A | 3/2000 | Miyazaki et al. | |
| 6,097,688 A | 8/2000 | Ichimura et al. | |
| 6,314,064 B1 | 11/2001 | Ueda et al. | |
| 6,388,967 B1 | 5/2002 | Furukawa et al. | |
| 6,392,977 B1 * | 5/2002 | Ando et al. | 369/112.01 |
| 6,430,137 B1 * | 8/2002 | Saimi et al. | 369/112.1 |
| 6,498,330 B1 * | 12/2002 | Yoshida | 250/201.5 |
| 6,798,731 B1 * | 9/2004 | Kim et al. | 369/124.14 |

FOREIGN PATENT DOCUMENTS

| | | |
|---|---|---|
| JP | 1-315039 | 12/1989 |
| JP | 7-121876 | 5/1995 |
| JP | 7-320295 | 12/1995 |
| JP | 8-147709 | 6/1996 |
| JP | 8-212557 | 8/1996 |
| JP | 10-116433 | 5/1998 |
| JP | 10-116434 | 5/1998 |
| JP | 11-250475 | 9/1999 |
| JP | 11-259893 | 9/1999 |

OTHER PUBLICATIONS

Sakashi Ohtaki et al., "The Applications of a Liquid Crystal Panel for the 15 Gbyte Optical Disk Systems", Jpn. J. Appl. Phys. vol. 38 (1999), pp. 1744-1749, Part 1, No. 3B, Mar. 1999.

* cited by examiner

OPTICAL PICKUP APPARATUS HAVING DISK THICKNESS DEVIATION CORRECTION AND METHOD THEREFOR

CROSS-REFERENCE TO RELATED APPLICATIONS

This is a divisional application of Ser. No. 09/711,949, filed Nov. 15, 2000, now U.S. Pat. No. 6,798,731, and claims the benefit of Korean Application No. 00-519 filed Jan. 6, 2000, in the Korean Patent Office, the disclosures of which are incorporated herein by reference.

BACKGROUND OF THE INVENTION

1. Field of the Invention

The present invention relates to an optical pickup apparatus for recording/reproducing information on/from a high density optical disk so that coma and spherical aberration due to changes in the thickness of the optical disk can be corrected, and more particularly, to an optical pickup apparatus in which a main light spot and an auxiliary light spot having spherical aberration are allowed to be formed on an optical disk and aberration can be corrected based on the main light spot and the auxiliary light spot received by a photodetector.

2. Description of the Related Art

In general, an optical pickup apparatus records or reproduces information recorded on or from an optical disk. With high densification of optical disks, light emitted from a light source is required to have a shorter wavelength while the numerical aperture (NA) of the light increases. Thus, when the optical pickup apparatus records/reproduces information on/from the optical disk, if the optical disk is inclined, that is, if the surface of the optical disk on which information is recorded is inclined with respect to the optical axis, a coma aberration is generated due to the inclination. Also, spherical aberration is generated due to the shorter wavelength of the light source due to the high densification of the optical disk, a high NA, and a change in the thickness of the optical disk and the wavelength accompanied by the accommodation of the compatibility with a low density optical disk.

Here, since coma aberration $W_{31}$ satisfies Equation 1, a coma aberration due to the inclination of the optical disk increases in an optical pickup with a high NA compared with coma aberration in an optical pickup with a relatively low NA with respect to the same inclination of the optical disk.

$$W_{31} \propto NA^3 \quad \text{[Equation 1]}$$

Also, the recording capacity of the optical disk is determined by the wavelength $\lambda$ of the light emitted from the light source and the NA of an objective lens, as shown in Equation 2.

$$\text{Diameter of focused spot} \propto \lambda/NA \quad \text{[Equation 2]}$$

Also, spherical aberration $W_{40d}$ generated due to a deviation $\Delta d$ in the thickness of the optical disk is defined by Equation 3.

$$W_{40d} = \frac{n^2-1}{8n^3}(NA)^4 \frac{\Delta d}{\lambda} \quad \text{[Equation 3]}$$

Here, n denotes the refractive index of the substrate of the optical disk and d denotes the thickness of the substrate.

Thus, according to Equation 2, when it is desirable to set the recording density of the optical disk to 15 gigabytes or greater, a light source emitting light having a short wavelength of about 410 nm and an objective lens having an NA of 0.6 or greater are required to be adopted. However, when the NA of the objective lens is increased in order to increase the recording density of the optical disk, the spherical aberration $W_{40d}$ generated due to the deviation $\Delta d$ in the thickness of the optical disk drastically increases because the spherical aberration is proportional to NA to the fourth power, $(NA)^4$.

Figure 1:
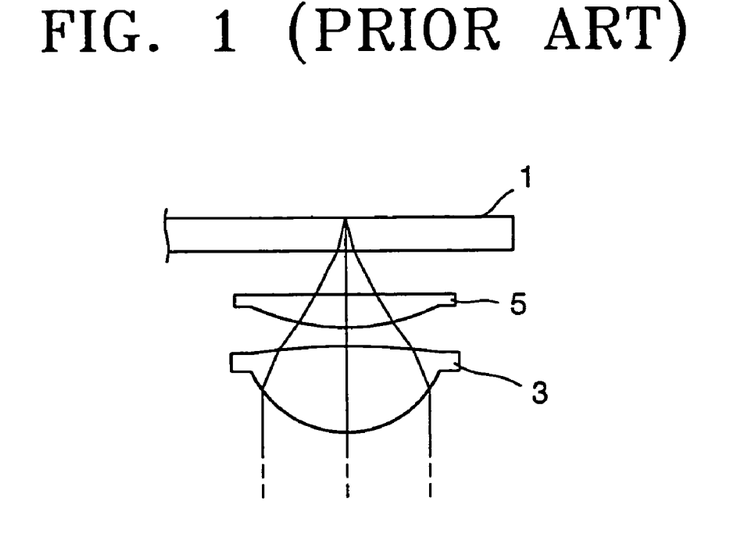
FIG. 1 is a diagram showing a conventional optical disk aberration correcting apparatus.

Referring to FIG. 1, a conventional optical disk aberration correcting apparatus to correct coma and spherical aberration includes an objective lens 3 for primarily focusing incident light and a focusing lens 5 for secondarily focusing the light focused by the objective lens 3 to form a spot on an optical disk 1.

Figure 2:
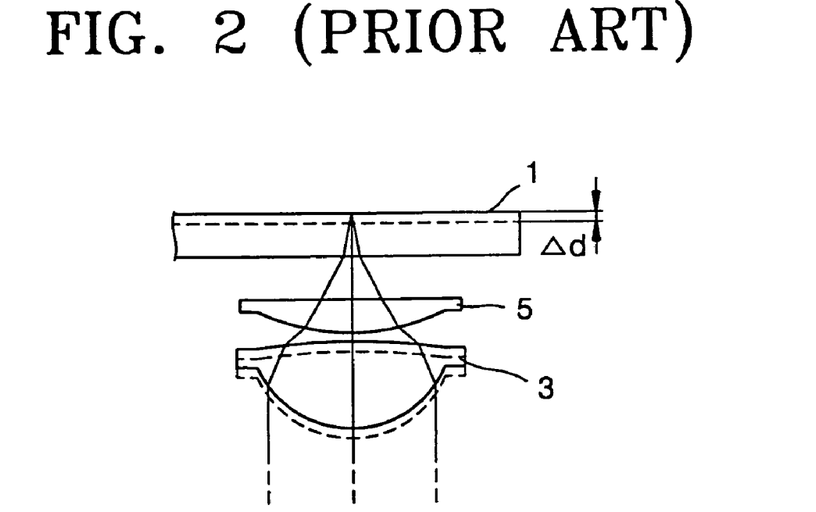
FIG. 2 is a diagram showing an optical disk thickness deviation correcting operation of an optical disk aberration correcting apparatus of FIG. 1.

When the optical disk 1 is inclined in one direction, coma aberration is corrected by driving the focusing lens 5 in the inclined direction. Also, when the spherical aberration due to the thickness deviation $\Delta d$ of the optical disk 1 is to be corrected, as shown in FIG. 2, the spherical aberration is corrected by adjusting an interval between the focusing lens 5 and the objective lens 3.

In the conventional optical disk aberration correcting apparatus having the above structure, since it is necessary to drive the objective lens and the focusing lens in a direction to control the tracking and focusing of a light spot, drive the focusing lens to be inclined, and drive the objective lens and the focusing lens to adjust the interval therebetween, the structure of the actuator is complicated.

SUMMARY OF THE INVENTION

To solve the above problems, it is an object of the present invention to provide an optical pickup apparatus which can correct spherical aberration due to a change in the thickness of the optical disk and a change in the wavelength and coma aberration due to inclination of the optical disk, by forming at least two light spots on the optical disk.

Additional objects and advantages of the invention will be set forth in part in the description which follows, and, in part, will be obvious from the description, or may be learned by practice of the invention.

Accordingly, to achieve the above and other objects, there is provided an optical pickup apparatus comprising a light source for emitting light, an optical path changer which changes a proceeding path of incident light, an objective lens which focuses incident light to form a light spot on an optical disk, and a light splitter, provided on the optical path between the light source and the optical path changer, which splits incident light into at least two light beams including first and second light beams so that at least two light spots including a main light spot having no aberration and an auxiliary light spot having a predetermined spherical aberration are formed on the optical disk. A photodetector including first and second light receiving portions respectively receives the first and second light beams reflected by the optical disk and passing through the optical path changer. A signal processing portion, including a delay which delays the phase of a second signal in order to synchronize a first signal and the second signal which are detected and opto-electrically converted by the first and second light receiving portions, compensating for the deviation in the thickness of the optical disk from the first and second signals which are synchronized with each other.

Advantageous features of the present invention is that, in order to correct for aberrations, it is not necessary to either drive the objective lens, the focusing lens in a direction to control the tracking and focusing of a light spot, to drive the focusing lens to be inclined, or to drive the objective lens and the focusing lens to adjust the interval therebetween.

BRIEF DESCRIPTION OF THE DRAWINGS

The above object and advantages of the present invention will become more apparent by describing in detail embodiments thereof with reference to the attached drawings in which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 3:
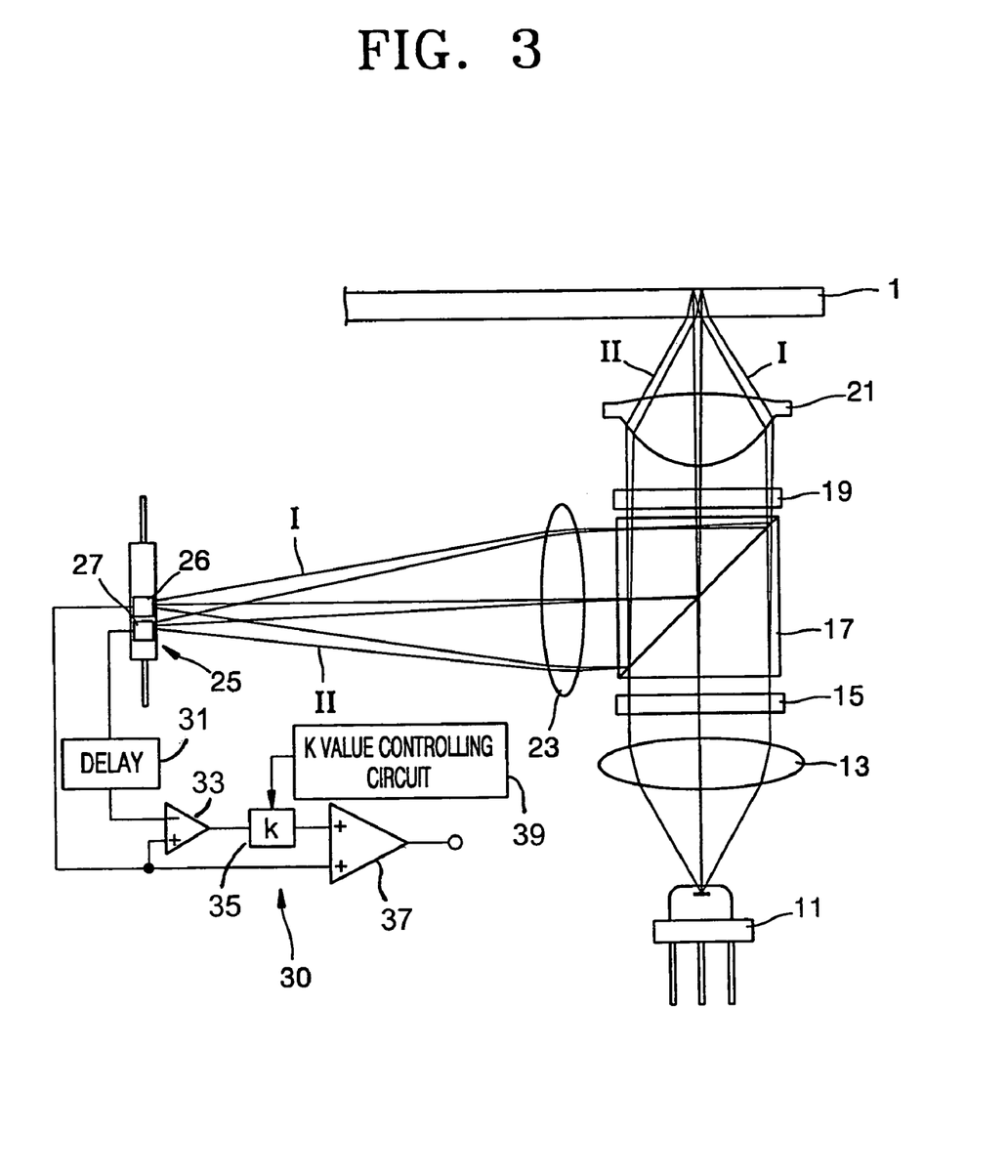
FIG. 3 is a diagram showing an optical configuration of an optical pickup apparatus according to an embodiment of the present invention.

Referring to FIG. 3, an optical pickup apparatus according to an embodiment of the present invention includes a light source 11, an optical path changer which changes the proceeding path of incident light, an objective lens 21 which focuses incident light, a light splitter which divides incident light so that at least two light spots are concurrently formed on the optical disk 1, a photodetector 25 which receives light reflected from the optical disk 1, and a signal processing portion 30 which corrects for a thickness deviation of the optical disk 1.

In order to increase the recording density of the optical disk 1 to 15 gigabytes or greater, a light source which emits light having a short wavelength of about 410 nm and an objective lens having an NA of 0.6 or greater are adopted as the light source 11 and the objective lens 21.

A divergent light emitted from the light source 11 passes through a collimating lens 13 to be focused and become a parallel beam. The parallel beam is split by a light splitter into at least two light beams, including first and second light beams I and II. Here, the first and second light beams I and II are focused on the optical disk 1 by passing through the objective lens 21. The first light beam I forms a main light spot having no aberration and the second light beam II forms an auxiliary light spot having a predetermined spherical aberration.

To split the incident light into the first and second light beams I and II by the light splitter and to simultaneously make the first and second light beams I and II aplanatic light and light having a predetermined amount of spherical aberration, respectively, a holographic optical element 15 which generates a predetermined spherical aberration on the second light beam II is preferably provided.

The optical path changer is provided on an optical path between the holographic optical element 15 and the objective lens 21 to change the proceeding path of incident light. That is, incident light output from the light source 11 travels toward the objective lens 21 and light reflected by the optical disk 1 and output from the objective lens 21 travels toward the photodetector 25. Preferably, the optical path changer includes a polarizing beam splitter 17 which changes the path of light by transmitting or reflecting the light according to the polarization direction of the incident light, and a phase retard plate 19 arranged on the optical path between the polarizing beam splitter 17 and the objective lens 21, which delays the phase of the incident light. The phase retard plate 19 is preferably a ¼-wave plate which delays the phase of the incident light by λ/4 to alter an incident linear polarized light and an incident circular polarized light into a circular polarized light and a linear polarized light, respectively.

The objective lens 21 focuses each of the first and second light beams I and II split by the holographic optical element 15 so that the beams are formed at adjacent track positions on the optical disk 1. The second light beam II is formed at the same track where the first light I is formed.

Each of the first and second light beams I and II reflected by the optical disk 1 passes through the objective lens 21, the phase retard plate 19 and the polarizing beam splitter 17 and is focused by a focusing lens 23 and received by the photodetector 25.

The photodetector 25 includes first and second light receiving portions 26 and 27 which receive the first and second light beams I and II, to generate signals $S_m$ and $S_{sub}$, respectively. The signal processing portion 30 corrects for the thickness deviation of the optical disk 1 using the signals $S_m$ and $S_{sub}$.

A subtractor 33 subtracts the signal $S_{sub}$ from the signal $S_m$. A difference signal $(S_m-S_{sub})$ is multiplied by a factor k by a k value multiplier 35 and the k-multiplied difference signal is added to $S_m$ by an adder 37. A k value controlling circuit 39 sets the value k according to the thickness of the optical disk 1. Preferably, a delay 31 delays the signal $S_{sub}$ prior to being subtracted from the signal $S_m$.

That is, the signal processing portion 30 corrects spherical aberration due to a change in the thickness of the optical disk by calculating a reproduction signal according to Equation 4.

$$\text{Reproduction signal}=S_m+k(S_m-S_{sub}) \quad \text{[Equation 4]}$$

Here, $S_m$ is a main reproduction signal corresponding to a main light spot which is received and photoelectrically converted by the first light receiving portion 26. $S_{sub}$ is a sub-reproduction signal corresponding to an auxiliary light spot which is received and photoelectrically converted by the second light receiving portion 27, and k denotes a gain factor.

The value k changes according to the deviation in the thickness of the optical disk 1 and has a negative or positive value according to deviations in the thickness. That is, the value k, controlled by the k value controlling circuit 39, is adjusted to be proportional to a signal provided by an optical disk thickness detecting sensor (not shown). Alternately, the value k may be adjusted by feeding back a result of monitoring jitter so that the jitter of the reproduction signal is made optimal.

By correcting the reproduction signal with the signal processing portion 30 according to Equation 4, the absolute value of the spherical aberration $W_{40d}$ generated by the deviation $\Delta d$ of the thickness of the optical disk 1 is 3 or less. As shown in FIG. 3, the signal processing portion 30, preferably, further includes the delay 31. When a phase difference, attributed to phase retard plate 19, between the signals received by the first and second light receiving portions 26 and 27 is generated, the delay 31 delays the phase of a signal having an earlier phase to synchronize the two signals.

The operation of correcting the reproduction signal by the signal processing portion 30 will be described with reference to FIGS. 4 through 7.

Figure 4:
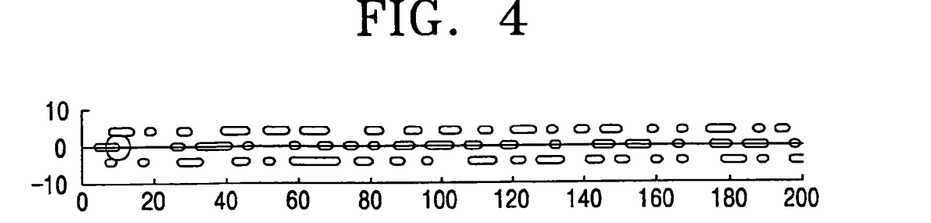
FIG. 4 is a diagram showing the structure of an optical disk having a track pitch of 0.37 μm and a minimum mark length of 0.25 μm.
Figure 5:
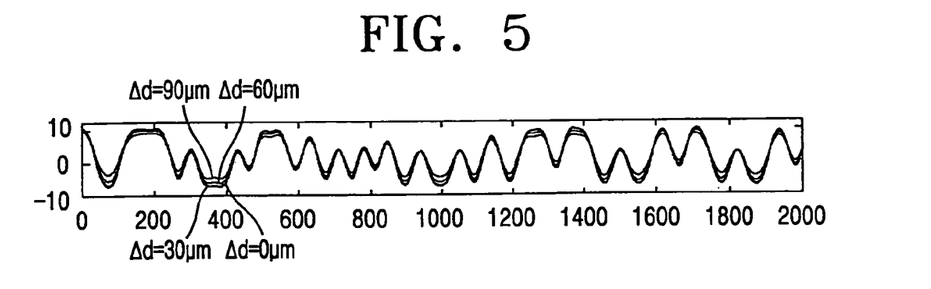
FIG. 5 is a graph showing a reproduction signal according to an optical disk thickness deviation.

FIG. 4 shows a part of an optical disk comprising pits of three rows having a track pitch of 0.37 μm and a minimum mark length of 0.25 μm. FIG. 5 shows the reproduction signal of the central track of FIG. 4. FIG. 5 shows reproduction signals (RF: radio frequency) when the thickness deviations of an optical disk substrate are 0, 30 μm, 60 μm and 90 μm.

First, when there is no thickness deviation and when there are thickness deviations of 30 μm, 60 μm and 90 μm, reproduction signals of a main light spot and an auxiliary light spot are defined as $d_0$, $d_{30}$, $d_{60}$ and $d_{90}$. Here, for example, it is assumed that there is no aberration in the main light spot introduced by the holographic optical element 15 and the spherical aberration of the auxiliary light spot corresponds to 20 μm. When a thickness deviation of 30 μm occurs due to allowance in manufacturing a substrate of the optical disk 1, the reproduction signal of the main light spot is $d_{30}$ and the reproduction signal of the auxiliary light spot is the same as that of the signal $d_{60}$ having a deviation of 60 μm. Here, the reproduction signal of $d_0$ is obtained from the signals $d_{30}$ and $d_{60}$ as follows. First a signal $(d_0-d_{30})$ is added to the signal $d_{30}$ to obtain the signal $d_0$.

Also, when a signal $(d_{30}-d_{60})$ is proportional to the signal $(d_0-d_{30})$, the same signal as the signal $d_0$ can be obtained from the operation of $d_{30}+k(d_{30}-d_{60})$, where k is a gain factor.

Figure 6:
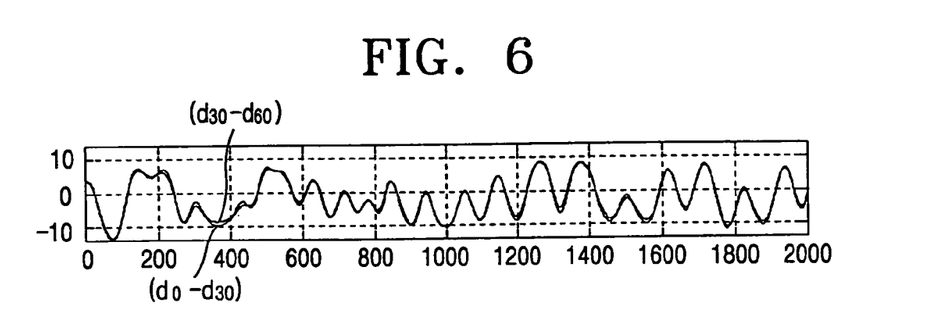
FIG. 6 is a graph showing a comparison result of a signal $(d_0-d_{30})$ and a signal $(d_{30}-d_{60})$ of FIG. 5.
Figure 7:
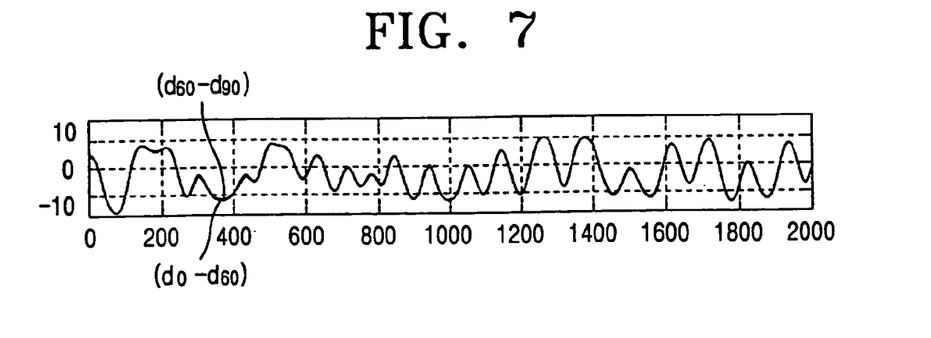
FIG. 7 is a graph showing a comparison result of a signal $(d_0-d_{60})$ and a signal $(d_{60}-d_{90})$ of FIG. 5.

FIG. 6 shows a result of comparing DC components and AC components of the signal $(d_0-d_{30})$ and the signal $(d_{30}-d_{60})$. FIG. 7 shows the result of comparing DC components and AC components of the signal $(d_0-d_{60})$ and the signal $(d_{60}-d_{90})$. In comparing FIG. 6 and FIG. 7, it can be seen that there is a proportional relationship between these signals. Thus, it is noted that a signal with no spherical aberration can be reproduced from the calculation of Equation 4.

Figure 8:
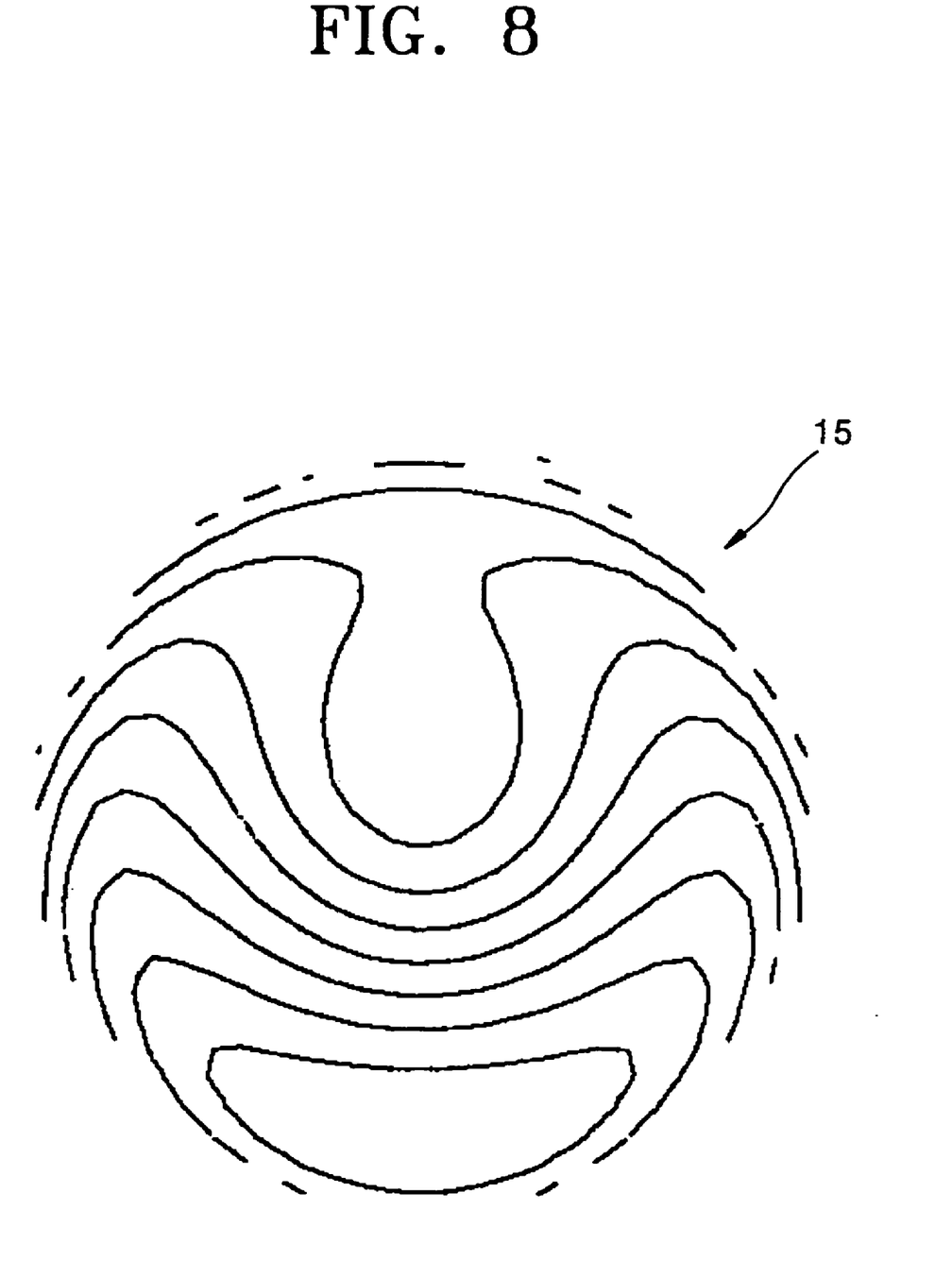
FIG. 8 is a view showing a diffraction pattern of the holographic optical element of FIG. 3.

Also, since the optical pickup apparatus according to the present invention includes a holographic optical element 15 having a pattern of a predetermined shape, such as shown in FIG. 8, coma aberration due to the inclination of the optical disk 1 can be corrected.

Figure 9:
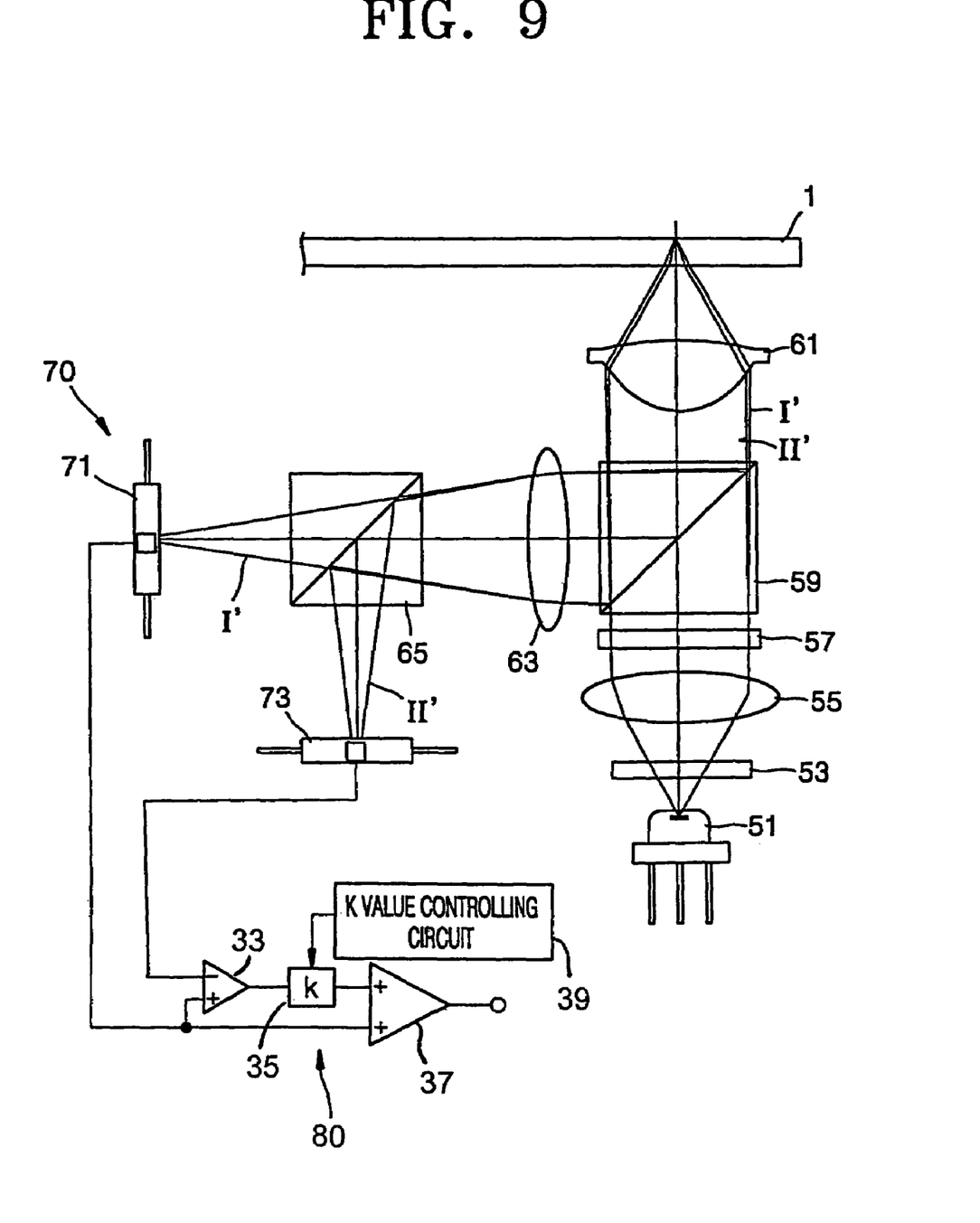
FIG. 9 is a diagram showing the optical configuration of an optical pickup apparatus according to another embodiment of the present invention.

Referring to FIG. 9, an optical pickup apparatus according to another embodiment of the present invention includes a light source 51, an optical path changer which changes the proceeding path of incident light, an objective lens 61 which condenses incident light, a light splitter which splits incident light such that at least two light spots are concurrently formed on the optical disk 1, a photodetector 70 which receives light reflected by the optical disk 1, and a signal processing portion 80 which corrects for a thickness deviation of the optical disk 1. Here, since the light source 51 and the objective lens 61 are substantially the same as light source 11 and objective lens 21, as shown in FIG. 3, detailed descriptions thereof will be omitted.

Divergent light emitted from the light source 51 is condensed and becomes a parallel beam, while passing through a collimating lens 55. The parallel beam is split into at least two light beams including first and second light beams I' and II' by the light splitter. The first and second light beams I' and II' pass through the objective lens 61 and are focused on the optical disk 1. The first light beam I' forms a main light spot having no aberration and the second light beam II' forms an auxiliary light spot having a predetermined spherical aberration. The first and second light beams I' and II' are focused at the same point on the optical disk 1 and are classified by the polarizing directions.

For the above operation, a polarizing holographic optical element 57 which generates a predetermined spherical aberration of the second light beam II' to make the first light beam I' a polarized light in one direction having no aberration and the second light beam II' a polarized light in another direction having spherical aberration, is provided as the light splitter. A phase delay plate 53 such as a ¼-wave plate which alters the direction of polarization by delaying the phase of the incident light is further provided on the optical path between the light source 51 and the polarizing holographic optical element 57.

The optical path changer 59 is provided on an optical path between the polarizing holographic optical element 57 and the objective lens 61 to change the proceeding path of the incident light. That is, the incident light emitted from the light source 51 is made to proceed toward the objective lens 61 while the light reflected by the optical disk 1 and emitted from the objective lens 61 is made to proceed toward the photodetector 70. For this purpose, the optical path changer includes a beam splitter 59 which alters the proceeding path of the light by transmitting or reflecting the incident light at a predetermined ratio of the amount of light, and a polarizing beam splitter 65 provided on an optical path between the beam splitter 59 and the photodetector 70 which transmits or reflects the incident light reflected by the optical disk 1, according to the polarization thereof. A focusing lens 63 which focuses light can further be provided on the optical path between the beam splitter 59 and the polarizing beam splitter 65.

First and second light receiving portions 71 and 73 of the photodetector 70 are arranged to receive the first and second light beams I' and II', respectively, split by the polarizing beam splitter 65. Thus, the first light beam I' of one polarization split by the polarizing beam splitter 65 is received by the first light receiving portion 71 and the second light beam II' of the other polarization is received by the second light receiving portion 73.

The signal processing portion 80 compensates for a deviation in the thickness of the optical disk 1 using the signals detected and photoelectrically converted through the respective first and second light receiving portions 71 and 73. Since the signal processing portion 80 is substantially the same as signal processing portion 30 described in the embodiment of FIG. 3, a detailed description thereof will be omitted. Preferably, the signal processing portion 80 may further include a feed-back circuit (not shown). The feed-back circuit makes the gain factor k of Equation 4 proportional to the amount of spherical aberration, and minimizes jitter.

As described above, in the optical pickup apparatus according to the present invention, since the main light spot and the auxiliary light spot are formed on the optical disk by using the first light with no aberration and the second light having spherical aberration, and since the reproduction signals of the light received by the respective first and second light receiving portions of the photodetector are detected through calculation using Equation 4, the deviation in the thickness of the optical disk and the aberration due to the inclined optical disk can be corrected so that the jitter property of the reproduction signal can be remarkably improved.

Figure 10:
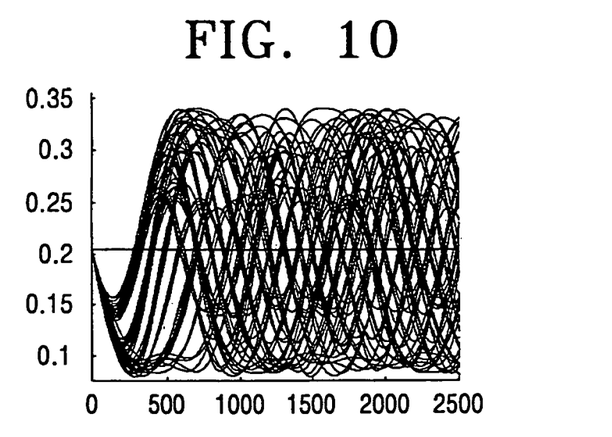
FIG. 10 is a graph showing an eye-pattern for a 60 μm thickness deviation.
Figure 11:
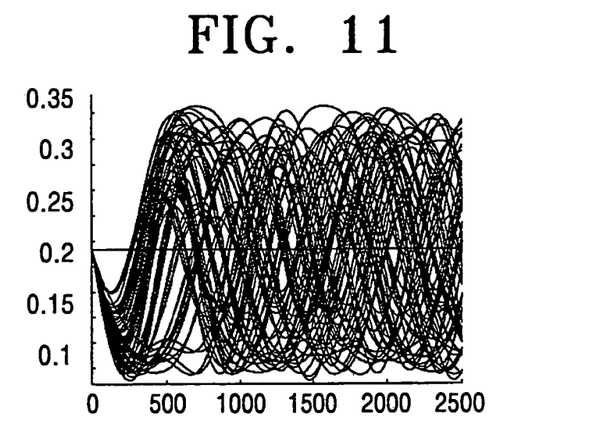
FIG. 11 is a graph showing an eye-pattern for a 90 μm thickness deviation.
Figure 12:
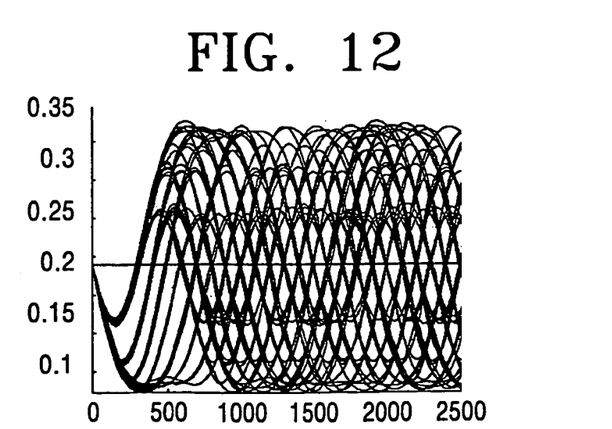
FIG. 12 is a graph showing an eye-pattern when the thickness deviation is corrected according to the preferred embodiments of the present invention.

That is, FIG. 10 is a graph showing an eye-pattern for a 60 μm thickness deviation. FIG. 11 is a graph showing an eye-pattern for a 90 μm thickness deviation. FIG. 12 is a graph showing an eye-pattern when the thickness deviation is compensated for by making calculations using Equation 4.

Referring to FIGS. 10 and 11, it can be seen that the case of the 60 μm thickness deviation has a jitter value of 10.1% and the case of the 90 μm thickness deviation has a jitter value of 15.5%. When the thickness is corrected by setting the gain factor k to 1.0, the jitter value is drastically improved to 7.7%, as shown in FIG. 13.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical pickup apparatus comprising:
a light source which emits a light beam;
a holographic optical element which:
splits the emitted light beam into first and second light beams,
polarizes the first light beam in a first direction,
polarizes the second light beam in a second direction and generates a predetermined spherical aberration to the second light beam;
an objective lens which focuses the first and second light beams to concurrently form a main light spot, having no aberration, and an auxiliary light spot having the predetermined spherical aberration, on an optical disk;
first and second photodetectors which photoelectrically convert light beams reflected from the optical disk and corresponding to the main light spot and the auxiliary light spot into first and second signals; and
a signal processor, which delays a phase of the second signal to synchronize the first signal and the second signal and combines the first and second signals to output a reproduction signal which corrects for a deviation in a thickness of the optical disk.

2. The apparatus as claimed in claim 1, wherein the signal processor comprises:
a subtractor which subtracts the delayed second signal from the first signal;
a multiplier which multiplies the subtraction result by a factor; and
an adder which adds the multiplied subtraction result and the first signal to output the reproduction signal.

3. The apparatus as claimed in claim 2, wherein an absolute value of a spherical aberration $W_{40d}$ of the auxiliary light spot generated according to a thickness deviation of the optical disk is less than or equal to 3, where:

$$W_{40d} = \frac{n^2-1}{8n^3}(NA)^4 \frac{\Delta d}{\lambda}$$

$\Delta d$ denotes a deviation in the thickness of the optical disk,
n denotes a refractive index of a substrate of the optical disk,
NA denotes a numerical aperture of the objective lens, and
$\lambda$ denotes a wavelength of the light emitted from the light source.

4. The apparatus as claimed in claim 2, wherein the signal processor further comprises a feed-back circuit which makes the gain factor k proportional to an amount of spherical aberration and which minimizes jitter.

5. The apparatus as claimed in claim 2, further comprising:
a first beam splitter which passes the first and second light beams from the holographic optical element toward the optical disk and reflects the light beams corresponding to the main light spot and the auxiliary light spot toward the first and second photodetectors; and
a polarizing beam splitter, which directs the light beams corresponding to the main light spot and the auxiliary light and reflected by the first beam splitter to the first and second photo detectors according to a polarization of the reflected light beams.

6. A method of generating a reproduction signal from an optical disk, comprising:
simultaneously forming first and second light spots on the optical disk; and
correcting spherical aberration due to a change in thickness of the optical disk by using the first and second light spots to determine the reproduction signal,
wherein the first and second light spots are formed on a same spot of the optical disk.

7. A method of generating a reproduction signal from an optical disk, comprising:
forming first and second light spots on the optical disk, wherein one of said first and second light spots is formed by a light beam having a predetermined spherical aberration and the first and second light spots are simultaneously formed on a same spot of the optical disk; and
correcting spherical aberration due to a change in thickness of the optical disk by using the first and second light spots to determine the reproduction signal.

8. A method of generating a reproduction signal from an optical disk, comprising:
forming first and second light spots on the optical disk wherein the first and second light spots are simultaneously formed on a same spot of the optical disk; and
correcting spherical aberration due to a change in wavelength of the first and second light spots and coma aberration due to inclination of the optical disk by using the first and second light spots to determine the reproduction signal.

9. A method of generating a reproduction signal from an optical disk, comprising:
forming first and second light spots on the optical disk wherein the first and second light spots are simultaneously formed on a same spot of the optical disk and one of said first and second light spots is formed by a light beam having a predetermined spherical aberration; and correcting spherical aberration due to a change in wavelength of the first and second light spots and coma aberration due to inclination of the optical disk by using the first and second light spots to determine the reproduction signal.

10. An apparatus for generating a reproduction signal from an optical disk, the apparatus comprising:
   a light system which forms a main light spot and an auxiliary light spot on a same spot of the optical disk, the main light spot having no aberration and the auxiliary light spot having a predetermined spherical aberration; and
   a detector which combines signals corresponding to light reflected from the main and auxiliary light spots to generate the reproduction signal.

11. An apparatus for generating a reproduction signal from an optical disk, the apparatus comprising:
   a tight system which forms a main light spot and an auxiliary light spot on the optical disk, the main light spot having no aberration and the auxiliary light spot having a predetermined spherical aberration, the light system comprising:
      a light source which emits light, and
      a holographic optical element, which splits the light source into first and second light beams to form the main light spot and the auxiliary spot, polarizes the first light beam in a first direction and the second light beam in a second direction, and generates the predetermined spherical aberration; and
   a detector which combines signals corresponding to light reflected from the main and auxiliary light spots to generate the reproduction signal.

* * * * *

UNITED STATES PATENT AND TRADEMARK OFFICE
CERTIFICATE OF CORRECTION

| | | |
|---|---|---|
| PATENT NO. | : 7,092,347 B2 | Page 1 of 1 |
| APPLICATION NO. | : 10/909347 | |
| DATED | : August 15, 2006 | |
| INVENTOR(S) | : Tae-kyung Kim et al. | |

It is certified that error appears in the above-identified patent and that said Letters Patent is hereby corrected as shown below:

Title Page, Insert Item -- (30)  Foreign Application Priority Data
January 6, 2000 (KR) 00-519 --

Column 10, line 1, change "tight" to -- light --

Signed and Sealed this

Thirteenth Day of February, 2007

JON W. DUDAS
*Director of the United States Patent and Trademark Office*